US010116056B2

(12) United States Patent
Thiel et al.

(10) Patent No.: US 10,116,056 B2
(45) Date of Patent: Oct. 30, 2018

(54) ANTENNA ARRANGEMENT AND CONNECTOR FOR AN ANTENNA ARRANGEMENT

(71) Applicant: HUBER+SUHNER AG, Herisau (CH)

(72) Inventors: Michael Thiel, St. Gallen (CH); Rafal Glogowski, St. Gallen (CH)

(73) Assignee: HUBER+SUHNER AG, Herisau (CH)

(*) Notice: Subject to any disclaimer, the term of this patent is extended or adjusted under 35 U.S.C. 154(b) by 118 days.

(21) Appl. No.: 15/326,615

(22) PCT Filed: May 5, 2015

(86) PCT No.: PCT/EP2015/059878
§ 371 (c)(1),
(2) Date: Jan. 16, 2017

(87) PCT Pub. No.: WO2016/008607
PCT Pub. Date: Jan. 21, 2016

(65) Prior Publication Data
US 2017/0207539 A1 Jul. 20, 2017

(30) Foreign Application Priority Data

Jul. 17, 2014 (CH) ...................... 1085/14

(51) Int. Cl.
H01Q 9/40 (2006.01)
H01Q 1/32 (2006.01)
H01Q 21/00 (2006.01)
H01R 4/02 (2006.01)
H01R 9/05 (2006.01)
H01R 24/52 (2011.01)
H04M 1/02 (2006.01)

(52) U.S. Cl.
CPC ............ H01Q 9/40 (2013.01); H01Q 1/3275 (2013.01); H01Q 21/0037 (2013.01);
(Continued)

(58) Field of Classification Search
CPC ............ H01Q 9/40; H01Q 1/32; H01Q 21/00
(Continued)

(56) References Cited

U.S. PATENT DOCUMENTS

| 4,851,859 A | 7/1989 | Rappaport |
| 8,299,372 B2 | 10/2012 | Swais et al. |
| 2011/0279337 A1* | 11/2011 | Corwin ............. H01Q 1/088 343/713 |

FOREIGN PATENT DOCUMENTS

| EP | 2 175 521 A1 | 4/2010 |
| GB | 2 351 395 A | 12/2000 |

(Continued)

OTHER PUBLICATIONS http://www.inexim.pl/Download/Kartykatalogowe RF/Anteny/SencityRail/1399.99.0130_dataSheet.pdf, Huber+Suhner AG, "Huber+Suhner Data Sheet—Sencity Rail MIMO Antenna: 1399.99.0130," Oct. 29, 2013 (Retrieved Jul. 10, 2015). pp. 1-2.

(Continued)

Primary Examiner — Andrea Lindgren Baltzell
(74) Attorney, Agent, or Firm — Pauley Erickson & Kottis

(57) ABSTRACT

An antenna arrangement includes a baseplate with a top surface defining a top level and a bottom surface defining a bottom level. First and second cup-shaped antenna radiating elements that have an apex arranged nearby to the top level of the baseplate and opposite to the apex an opening that is arranged distal to the top level of the baseplate. The antenna radiating elements are arranged above the baseplate and are spaced apart by a spacing and electrically interconnected to the baseplate. The first antenna radiating element is electrically interconnected to an inner conductor of a first coaxial cable, the inner conductor being arranged in the region of the apex above the bottom level. The second antenna radiating element is electrically interconnected to an inner conductor of a second coaxial cable, said inner conductor being arranged in the region of the apex above said bottom level.

22 Claims, 4 Drawing Sheets

(52) U.S. Cl.
CPC ............... *H01R 4/023* (2013.01); *H01R 9/05* (2013.01); *H01R 24/52* (2013.01); *H01R 2201/02* (2013.01); *H04M 1/026* (2013.01)

(58) Field of Classification Search
USPC ......................................................... 343/713
See application file for complete search history.

(56) References Cited

FOREIGN PATENT DOCUMENTS

| WO | WO 2005/060048 A1 | 6/2005 |
|---|---|---|
| WO | WO 2007/048258 A1 | 5/2007 |

OTHER PUBLICATIONS http:www.inexim.pl/Download/Kartykatalogowe RF/Anteny/SencityRail/1399.99.0037_Series_Data_Sheet_84080682.pdf, Huber+Suhner AG, "Huber+Suhner Data Sheet+Sencity Rail Antenna: 1399.99.0037," Jun. 8, 2012 (Retrieved Jul. 10, 2015j, pp. 1-2.
http://web.archive.org/web/20140416063747/http://www.adaptershop.de/Antennenadapter/Adapterstecker:::107_361.html, Wolanski, R., "Adapterstecker—Auto Adapter Stacker Kabel", Apr. 16, 2014 (Retrieved Jul. 13, 2015), & Wolanski, R., "Antenne Montage Stecker ISO gewinkelt Reparatursatz auto PKW KFZ Autoradio Radio—Auto Adapter Steckel Kabel." Jul. 14, 2015 (Retrieved Jul. 14, 2015), 7 pages total.

\* cited by examiner

ANTENNA ARRANGEMENT AND CONNECTOR FOR AN ANTENNA ARRANGEMENT

BACKGROUND OF THE INVENTION

Field of the Invention

The present invention is directed to an antenna arrangement and a connector suited to be used for such an antenna arrangement.

Discussion of Related Art

With the rapid expansion of smart phones and other types of cellular mobile phones is causing a high increase in data traffic volumes. Antenna arrangements suited for broadband radio frequency (RF) signal transmission play an important role in mobile telecommunication and hence are widely used for cellular mobile systems. In order to cope with the demand of increasing data transfer rates, multiple-input-multiple-output (MIMO) antenna arrangements that comprise multiple antenna radiating elements becomes more and more important.

However antennae suited for RF signal transmission have to fulfil very specific design requirements in order to obtain optimal RF characteristics. For example the shape of an antenna radiating element and its arrangement within an antenna arrangement, as well as the way it is connected to a feeding cable often have to satisfy strict criteria.

WO2007048258 A1 was published on 3 May 2007 on behalf of the same applicant and shows an antenna arrangement having a broadband monopole antenna suited for RF-applications. The application discloses an antenna which has two electrically conductive base bodies adjacent to each which are arranged on an electrically conductive baseplate. Said two electrically conductive base bodies are connected to the baseplate by means of a connection means. According to the invention RF power is fed in via a coaxial cable, whose outer conductor is connected to the baseplate while its inner conductor is connected to a feedpoint arranged at one of the conductive base bodies close to the baseplate.

WO2005060048 A1 was published on 30 Jun. 2005 on behalf of KATHREIN-WERKE KG and shows a broadband antenna. The application discloses an antenna comprising a cup-like shaped emitter arranged on a baseplate, said emitter projecting upwards from the baseplate. The baseplate comprises a through opening arranged at a foot point of the emitter. A coupling element in the form of a rod extends through said opening and may be connected to a feed line for the antenna. Said coupling element in form of a rod is inserted into a coupling element in form of a tube that is arranged at the emitter. These two coupling elements are not galvanically connected to one another, hence may be separated by an electric insulator.

U.S. Pat. No. 8,299,372 B2 was published on 30 Oct. 2012 and describes an antenna universal mount joint connector. The document shows an angle connector that can be used to connect a coaxial cable to an antenna. A connector according to the document comprises multiple sleeve-like components and pins, what implies minimum dimensions in order to allow proper assembly. The document further discloses that a connector according to the invention may be connected to a mounting surface (plate) using a mount nut. In mounted state, a first part of the connector is located on one side of the mounting plate while a second part is located on the other side, leading to a relatively high total height.

SUMMARY OF THE INVENTION

In many cases the above mentioned criteria to RF components of an antenna arrangement may be conflicting with other requirements to an antenna arrangement, such as requirements regarding maximum outer dimensions of an antenna arrangement or the way how such an antenna arrangement is connected to a feeding cable. This in specific holds true for antenna applications on vehicles such as trains, light rail vehicles, buses and other types of vehicles.

Such antennae may e.g. serve as repeaters that allow passengers to use their cellular phones in a vehicle. Therefore antenna arrangements are typically positioned on the roof of a road or rail vehicle and connected by cables to an antenna arrangement within said vehicle. In order to reduce air drag and, in case of many electric rail vehicles, maintain a minimum distance to the aerial contact line, such antenna arrangements need to have a relatively small total height. In addition, low-profile antenna arrangements may be advantageous for indoor use, respectively in-house communication, where an unobtrusive flat design may be required.

In addition, in order to prevent the intrusion of water into a vehicle, the number of ports required in the roof of a vehicle in order to connect an antenna arrangement located on said roof must me as low as possible.

It is therefore an object of the invention to provide an antenna arrangement suited for MIMO applications which has a low profile, hence a relatively small height.

A further object of the invention is to provide an antenna arrangement with more than one antenna radiating element which comprises a low number of connecting ports.

A further object of the invention is to provide a connector which can be used to connect a coaxial cable to a radiating antenna element.

According to one aspect of the invention an antenna arrangement which may be used for radio frequency MIMO applications comprises a baseplate which is at least partially electrically conductive. However, an antenna arrangement according to the invention is not limited to said types of applications. A baseplate may be made from a metal, such as an aluminium alloy or steel. It may also be made from an electrically conductive non-metal material. Said baseplate may also be made from an electrical insulating material or a material with a low or medium electrical conductivity with comprises one or multiple electrically conductive coatings (e.g. metal coating of plastic material). Said baseplate may be formed integrally or may be assembled from multiple parts. According to the invention, said baseplate has a top surface which defines a top level and a bottom surface that defines a bottom level. The top level may be regarded as the level defined by the top surface if relatively small elevations and/or recesses arranged at the top surface are disregarded. The bottom level may be regarded as the level defined by the bottom surface if relatively small elevations and/or recesses at the bottom surface are disregarded. The top and/or bottom surface may comprise recesses and/or elevations, such as bores, grooves, channels, platforms, pins etc. Said antenna arrangement further comprises a first and a second cup-shaped antenna radiating element. It is clear that an antenna arrangement according to the present invention is not limited to two antenna radiating elements and hence may also comprise three, four, five, six or more antenna radiating elements necessary for e.g. MIMO application. The first and second antenna radiating element may be the same types of radiating element or may be different types of radiating elements. The shape of such an antenna radiating element may also be described as conical-shaped and/or pyramidal-shaped. However, within this context also just a part of an antenna may be bowl- and/or cup- and/or conical- and/or pyramidal shaped, whereas other parts may be shaped differently. Said antenna further has an apex which is arranged nearby to the top level of the baseplate. For some purposes an antenna radiating element may also comprise more than one apex. Opposite to the apex the antenna further comprises an opening which is arranged distal to the top level of the baseplate. The opening may also be covered by a cover means. If appropriate, other components may be arranged in the opening, as will be described in detail below. Alternatively or in addition, the opening may also be fully or partially filled with a filling material, such as a insulating material. Said first and the second antenna radiating element are both arranged above the baseplate and spaced apart with respect to each other by a spacing. Both antenna radiating elements are electrically interconnected to the baseplate. Such an electrical interconnection may e.g. be obtained by forming the antenna radiating elements and the baseplate integrally. Alternatively or in addition the antenna radiating elements may be mechanically and electrically be connected to the baseplate by at least one support means, which may be a stand as will be described in detail below. Furthermore the first antenna radiating element is electrically interconnected in the region of its apex to an inner conductor of a first coaxial cable, said inner conductor being arranged in the region of the apex above said bottom level. Also the second antenna radiating element is electrically interconnected in the region of its apex to an inner conductor of a second coaxial cable, said inner conductor being arranged in the region of the apex above said bottom level. The electric interconnection may be established at the apex. However it may also be established in some distance from the apex or the apexes. An electric interconnection may e.g. be obtained by direct mechanical contact (e.g. by a soldering joint and/or welding joint and/or clamping) and/or capacitive coupling. A baseplate according to the invention further comprises at least one port which is arranged in the bottom surface of the baseplate. The port may be a through bore that extends from the top surface to the bottom surface and/or a recess in the bottom surface. The port may comprise multiple (sub-)ports, such as multiple thorough openings and/or recesses.

For some purposes the port of an antenna arrangement may be arranged in the area between the first and the second antenna radiating element with at least one of the coaxial cables extending across the bottom level of the baseplate through said port. If appropriate, the first and the second coaxial cable are passing through the same port or the same group/assembly of sub-ports. Additional coaxial cables and/or other types of cables may pass through the same port or the same group of sub-ports. This may be appropriate for antenna arrangements with more than two antenna radiating elements and/or supplemental antennae or electronic devices, such as GPS modules. For some applications also mass transfer may occur through the port, such as a cooling media that may pass through the port in both directions. If appropriate, the inner conductors of the first and second coaxial cables are between the apex and the port substantially arranged between the top level and the bottom level. Hence at least portions of the coaxial cables may be arranged between the top level and the bottom level.

For some purposes the baseplate may comprise at least one channel in which at least one inner conductor is arranged. Such a channel may allow a mechanically and electrically advantageous cable routing. If appropriate, at least one channel may be arranged in the top and/or the bottom surface of the baseplate. A channel may e.g. comprise a groove or be a groove. For some purposes a channel may also substantially extend within the baseplate, hence not be visible from the top or the bottom of the baseplate. Such channels arranged within the baseplate may e.g. be obtained using a baseplate built up from two or more layers. If appropriate, the at least one inner conductor arranged in the at least one channel may be part of a coaxial cable. Alternatively of in addition the channel may also be filled with a solid insulator and/or a foam insulator which supports the coaxial cable and/or inner conductor. If appropriate, the inner channel may also be filled with air, wherein the inner conductor is supported by spacer elements. If desired, the boundary walls of the channel may be connected to the outer conductor of a coaxial cable or may be the outer conductor of the coaxial cable.

If appropriate, each of the antenna radiating elements is fixed to said baseplate by at least one stand. Such a stand may be used to keep the antenna in a predefined position with respect to the baseplate and obtain a specified kind of electrical connection between the baseplate and an antenna radiating element. A stand may e.g. be a column, a cylinder or a tube and may be connected to the baseplate e.g. by a soldering joint, a welding joint, a screw connection or another type of connection that is appropriate to obtain a certain type of mechanical and/or electrical connection. Good connections may be achieved if the baseplate comprises an elevation and/or recess at the contact area with a stand, e.g. an elevated platform or a bore. For some applications, good results may be obtained using two or three stands for each antenna radiating element. Depending on the application, at least one stand may be a arranged in a distance from the apex of the antenna radiating element in order to increase mechanical stability and to optimize radiating characteristics.

Between the apex of at least one antenna radiating element and the bottom level a connector may be embedded in the baseplate. Such a connector may comprise an inner conductor which in a mounted position is electrically interconnected to the antenna radiating element and to the inner conductor of the thereto related coaxial cable. Good results, such as a minimum total height of an antenna arrangement may be obtained if the inner conductor is inserted into an opening arranged in the top and/or the bottom surface of the baseplate. Such an opening may e.g. be a through hole or a blind hole. If appropriate, the connector may be press-fitted in an opening arranged in the top and/or bottom surface of the baseplate. For some purposes the inner conductor of the connector may comprise an opening in which the inner conductor of the thereto related coaxial cable is arranged. Such an opening may e.g. be a slot or a lateral bore. Good results may be obtained if the opening is arranged at the proximal and of the inner conductor of the connector.

For some purposes, the inner conductor of the connector may be a pin which reaches into a socket arranged at an antenna radiating element. Such a socket may be arranged in the region of an apex of the antenna radiating element and protrude into the opening of said antenna radiating element. The socket may be press-fitted into the antenna radiating element or may be integrally formed with the antenna radiating element. If appropriate, the socket may comprise spring fingers that may be in mechanical and electrical connection to a distal end region of the pin. Such a mechanical and electrical connection may be obtained by circumferential contact points between the distal end region of the pin and the spring fingers. If desired, the contact points may also be located at another region of the pin.

Alternatively, the inner conductor of the connector may be a socket in which, in mounted state, a pin arranged at the first or the second antenna radiating element may be located.

If appropriate, an insulator may be arranged in the opening of the connector, supporting the inner conductor. Such an insulator may be made from PTFE, PE, a ceramic material or another material with appropriate dielectric and mechanical properties. Depending on the application, good results may be obtained if the insulator is separated from the antenna radiating element by a first gap.

For some purposes, the connector may comprise a connector body which may be electrically interconnected to the outer conductor of the first or second coaxial cable. If appropriate, the connector body may be formed integrally with the baseplate. A connector body may also comprise a connector port arranged on a side turned away from the connected antenna radiator element. Such a port may be used in order to access the region where the inner conductor of a coaxial cable and the inner conductor of the connector may have to be connected, such as by soldering and/or welding. When the connector is in a mounted state, a port may be covered by the baseplate, forming a shield in order to avoid RF leakage.

For some applications, an antenna arrangement may also comprise at least one GPS module (antenna) which may be arranged in the opening of an antenna radiating element. Such a GPS module (antenna) may be interconnected with a supplemental cable that extends from the opening of the antenna radiating element to a passage arranged in a stand of the antenna radiating element to a channel arranged in the baseplate, which may extend to the at least one port arranged in the bottom face of the baseplate.

For some purposes an antenna arrangement may comprise a radome arranged on the top surface of the baseplate. Such a radome may be fastened using screws and may be sealed using a corresponding radome gasket. Depending on the application, a radome may offer protection from weather and/or airstream and/or vandalism etc.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

FIG. 4 is a portion of the antenna arrangement according to FIG. 1 in a perspective view from the top with;

DETAILED DESCRIPTION OF THE INVENTION

Figure 1:
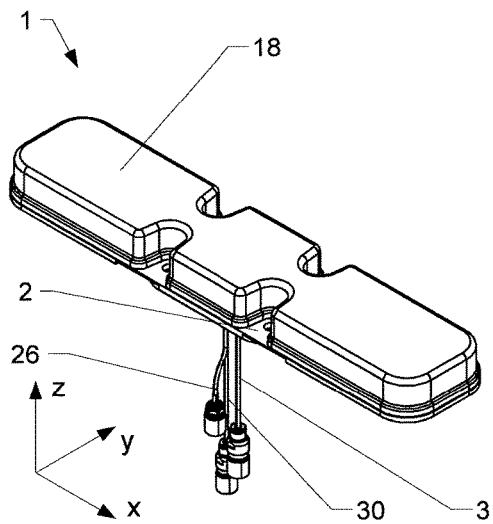
FIG. 1 is an embodiment of an antenna arrangement in a perspective view from the top.
Figure 2:
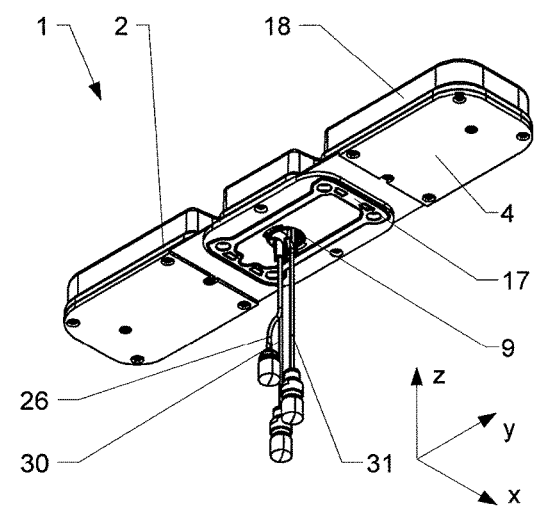
FIG. 2 is an antenna arrangement according to FIG. 1 in a perspective view from the bottom.
Figure 3:
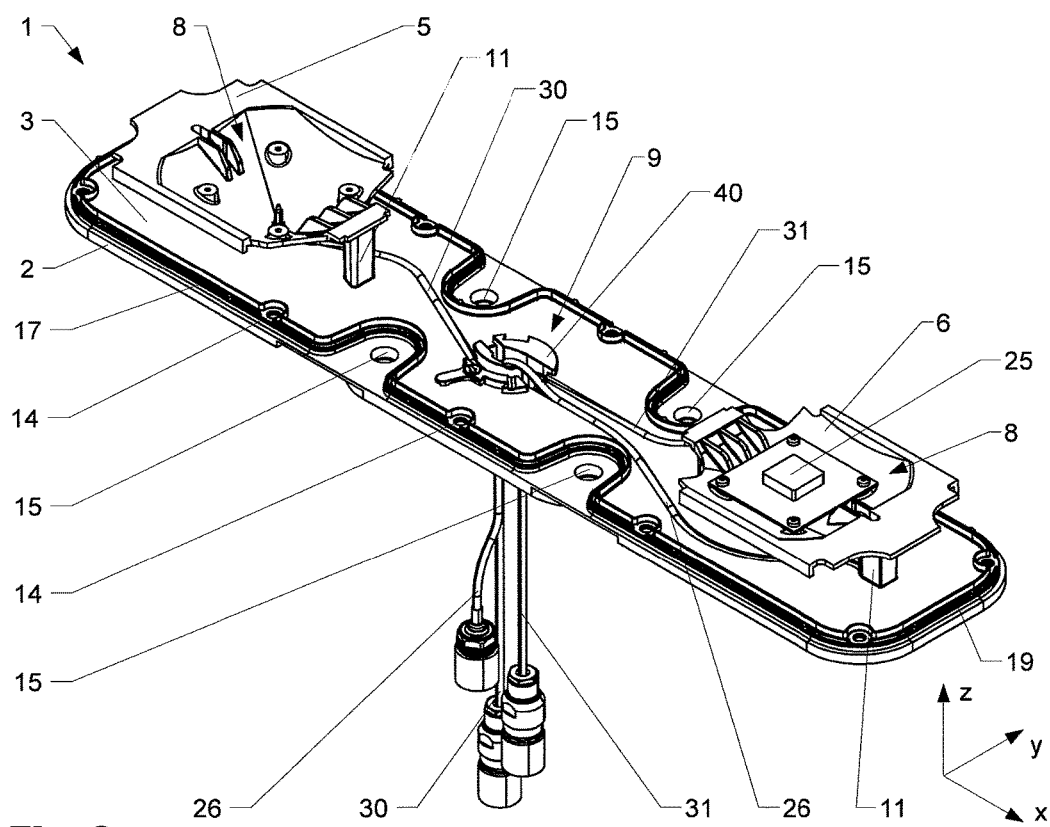
FIG. 3 is the antenna arrangement according to FIG. 1 in a perspective view from the top with the radome removed for illustrative purposes.
Figure 4:
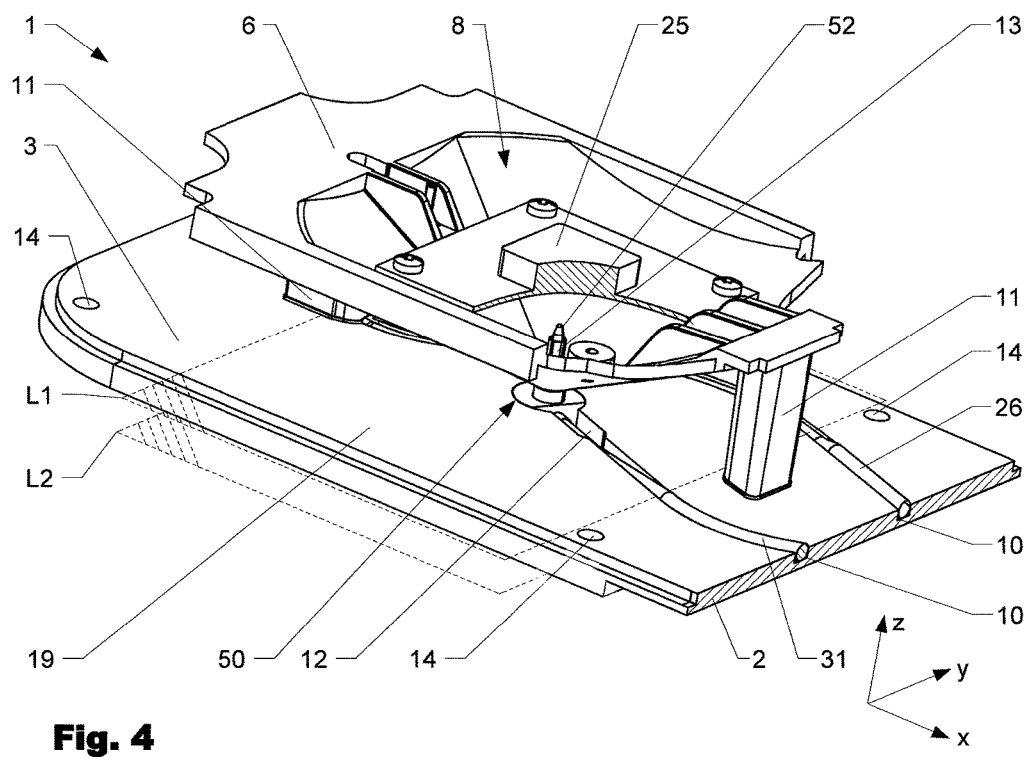
Figure 5:
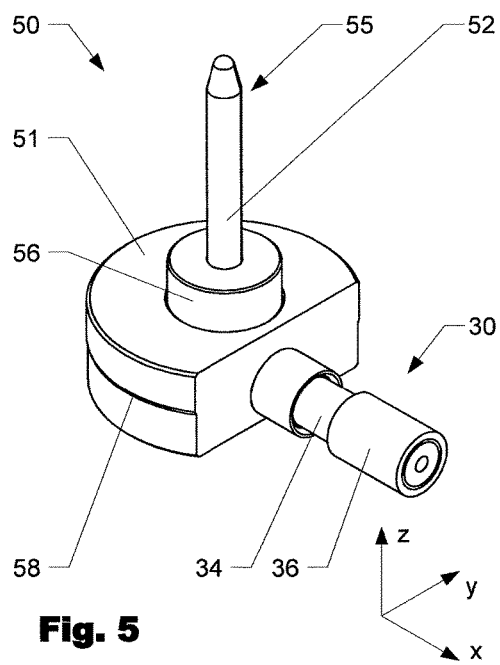
FIG. 5 is an embodiment of a connector with a coaxial cable in a perspective view from the top.
Figure 6:
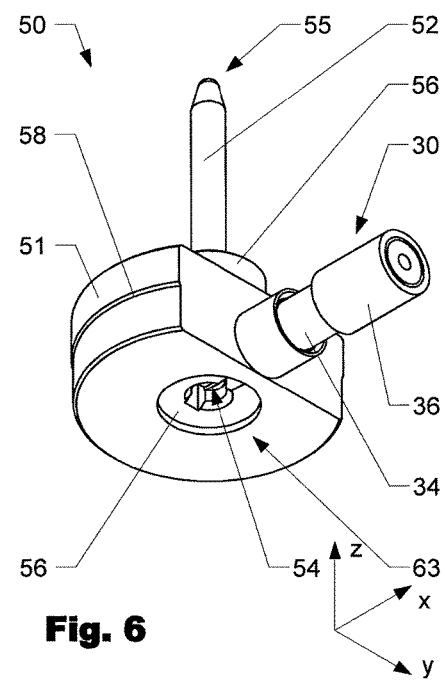
FIG. 6 is the embodiment of a connector according to FIG. 5 with a coaxial cable in a perspective view from the bottom.
Figures 7, 8:
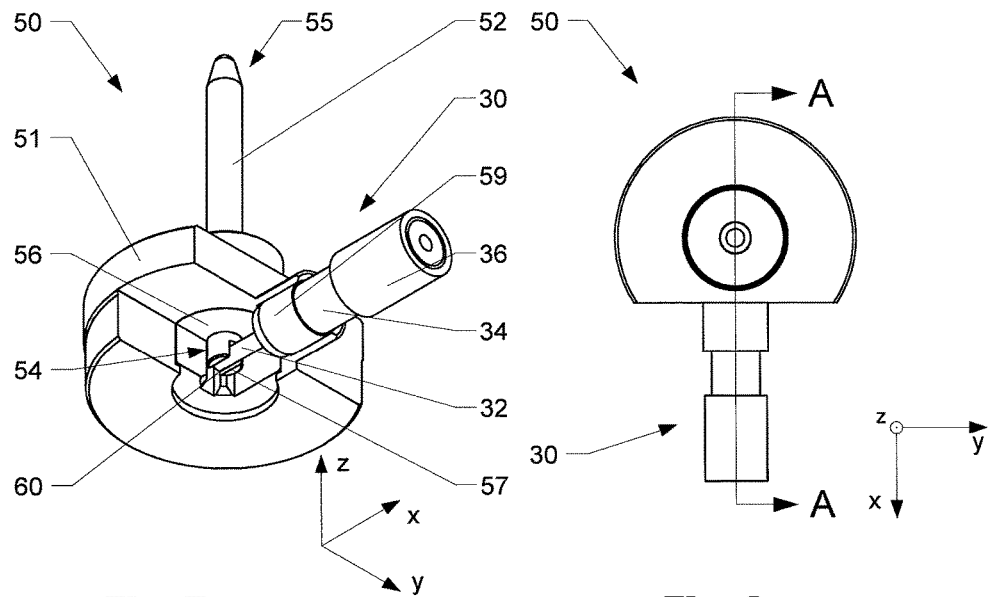
FIG. 7 is the embodiment of a connector according to FIG. 5 with a coaxial cable in a perspective view from the bottom, a section of the connector removed for illustrative purposes.
FIG. 8 is an embodiment of a connector with a coaxial cable in top view.
Figures 9, 10:
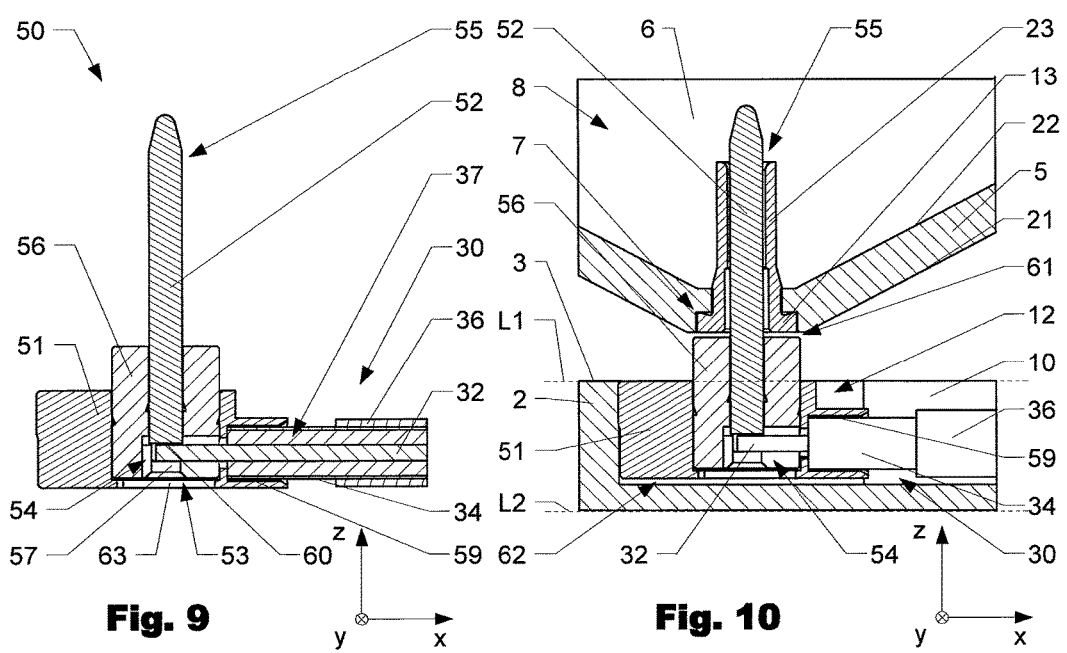
FIG. 9 is section AA of FIG. 8.
FIG. 10 is a section view of an embodiment of a connector arranged in a baseplate, connected to an antenna.
Figure 11:
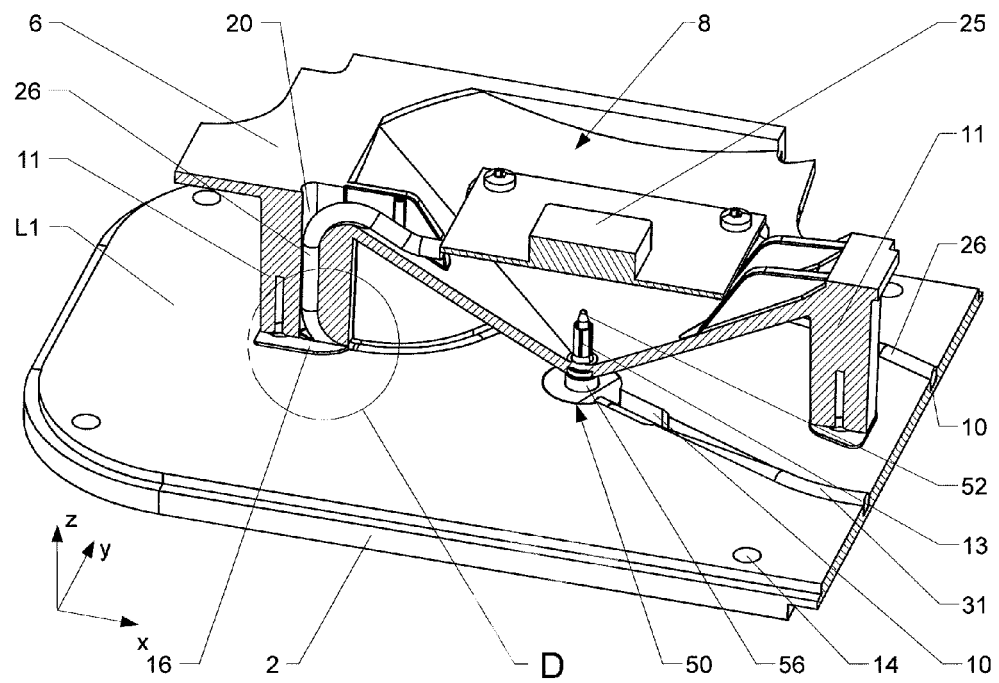
FIG. 11 is a portion of an antenna arrangement with an antenna radiating element partially cut for illustrative purposes in a perspective view from the top.
Figure 12:
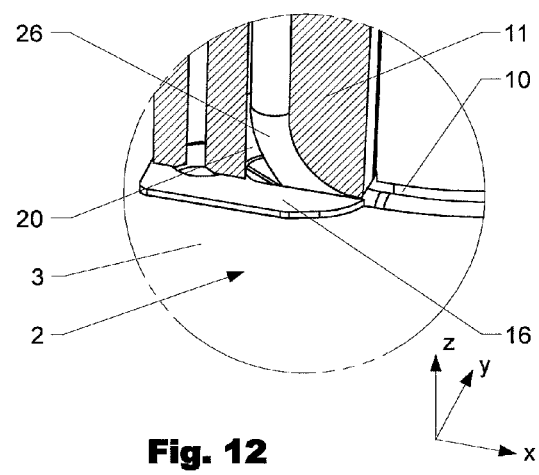
FIG. 12 is detail D of FIG. 11.

FIG. 1 shows an embodiment of an antenna arrangement 1 with a radome 18 in a perspective view from the top, whereas FIG. 2 shows the antenna arrangement 1 in a perspective view from the bottom. FIG. 3 shows the antenna arrangement 1 without a radome in a perspective view from the top. FIG. 4 shows a part of an antenna arrangement 1 in a perspective view from the top. For illustrative purposes a portion of a GPS module 25 arranged within an opening 8 of an antenna radiating element 6 was cut. FIG. 5 shows an embodiment of a connector 50 in a perspective view from the top. For illustrative purposes a portion of a coaxial cable 30 is connected with the connector 50. FIG. 6 shows an embodiment of a connector 50 with a portion of coaxial cable 30 in a perspective view from the bottom. FIG. 7 shows the connector 50 of FIG. 6 with a portion of a connector body 51 and insulator 56 removed for illustrative purposes in order to reveal an inner part of the connector 50. FIG. 8 shows an embodiment of a connector 50 with a coaxial cable in top view. Section AA of said connector 50 is shown in FIG. 9. In FIG. 10 a connector 50 arranged in a recess in the top surface 3 of a baseplate 2 is shown in a cross section. The connector 50 is connected to an antenna radiating element 5 and a coaxial cable 30. For illustrative purposes, the coaxial cable 30 is not shown in cross section. In FIG. 11 a portion of an embodiment of an antenna arrangement 1 with an antenna radiating element 6 partially cut for illustrative purposes is shown. Detail D of FIG. 11 is shown in FIG. 12.

As shown in FIG. 1, an antenna arrangement 1 may have a longitudinal cuboidal shape. The inner section of the antenna arrangement 2 shown is covered by a radome 18 arranged on a baseplate 2. The antenna arrangement 1 as shown further comprises a first and a second coaxial cable 30, 31 as well as a supplemental cable 26 which may be a coaxial or a non-coaxial cable. As shown in FIG. 2, an antenna arrangement 1 may comprise in its bottom surface 4 a port 9 though which the cables 26, 30, 31 pass into the inner section of the antenna arrangement 1. In addition, a baseplate gasket 17 may be arranged on the bottom surface. When mounted on a vehicle, said baseplate gasket may serve as a sealing agent between the antenna arrangement 1 and the roof of a vehicle (not shown) in order to prevent the intrusion of water into the port 9 of the antenna arrangement 1 and/or a port arranged in the roof of the vehicle.

As can be seen in FIG. 3, an antenna arrangement 1 may comprise a radome gasket 19 arranged e.g. on its top surface 3. In order to attach a radome 18, the baseplate 2 may comprise first fastening holes 14 into which screws (not shown) may be inserted from the bottom side of the baseplate 2 in order to connect the radome 18. In addition, the baseplate 2 may also comprise second fastening holes 15 which are able to receive screws (not shown) in order to screw it to e.g. the roof of a vehicle. If preferred, these second fastening holes 15 may even be accessible when a radome 18 is mounted, as indicated in FIG. 1. An antenna arrangement 1 may comprise a first and a second antenna radiating element 5, 6 that are arranged on the top surface 3 of the baseplate 2 by means of stands 11 as will be explained in more detail below. Said antenna radiating elements 5, 6 may have a cup-like or bowl-like shape comprising an opening 8. In some embodiments, an antenna arrangement 1 may comprise one or multiple additional electronic devices 25 arranged in said opening 8, such as a GPS module. The first and the second antenna radiating elements 5, 6 are connected to a first and a second coaxial cables 30, 31 which extend from the antenna radiating elements 5, 6 to a port 9 which is located in between said antenna radiating elements 5, 6. Said coaxial cables 30, 31 pass the baseplate 2 through said port 9. In the port a cable deflecting element 40 is arranged. The additional electronic device 25 is connected to a supplemental cable 26 which may also extend to the port 9 and pass through the baseplate 2.

As shown in FIG. 4, in some embodiments of an antenna arrangement a coaxial cable 31 may be at least partially be arranged in a channel 10 arranged in the top surface 3, the inner conductor (not shown) of the coaxial cable 31 being at least partially in between a top level L1 defined by a top surface 3 and a bottom level L2 defined by a bottom surface (not shown) of the baseplate 2. The top and bottom level L1, L2 are schematically indicated by dotted planes.

The antenna radiating element 6 is in electrical contact with the inner conductor of the coaxial cable 31 by means of a connector 50 that is arranged in an opening 12 arranged in the top surface 3. The connector 50 comprises an inner conductor 52 formed as a pin, which is connected at its proximal end (not shown) to the inner conductor of the coaxial cable 31, while (in mounted state) its distal end is inserted in a socket 13 of the antenna radiating element 6. Said connection will be explained in more detail below.

As shown in FIG. 5, an embodiment of a connector 50 may comprise a connector body 51. An insulator 56 is arranged in an opening 53 that extends from a top face to a bottom face of the connector body 51. Said insulator 56 partially protrudes from the opening 53. Within the insulator 51 an inner conductor 52 is arranged, said inner conductor 52 in the embodiment shown being formed like a pin. The connector body 51 may further comprise a shoulder 58 which may be advantageous in order to obtain a proper press-fit connection between the connector body 51 and an opening 12 in the baseplate. On one side the connector 50 may comprise a bore in which a coaxial cable 30 can be inserted. As shown, the coaxial cable 30 may comprise a jacket whereof a portion may be removed in order to expose the outer conductor 34 of the coaxial cable 30. As shown in FIG. 6, a connector 50 may also comprise a port 63 which can be used to access the proximal end region 54 of the inner conductor 52 in order to e.g. connect it to the inner conductor of the coaxial cable 30, as indicated in FIG. 7. The inner conductor 52 of a connector 50 comprises an opening 57 in the form of a slot which can receive the inner conductor 32 of the coaxial cable 30. A first electric junction 59 between the outer conductor 34 of the coaxial cable 30 and the connector body 51 may be obtained by a soldering. A second electric junction 60 between the inner conductor 32 of the coaxial cable 30 and the inner 52 conductor of the connector may also be obtained by a soldering, which is also indicated in further detail in FIG. 9.

As can be seen in FIG. 10 a connector may be is arranged in an opening 12 which is arranged in this embodiment of an antenna arrangement 1 at the top surface 3 of baseplate 2. In mounted state, the connector body 51 is substantially arranged between the top and bottom level L1, L2. The same holds true for the inner conductor 32 of the coaxial cable 30. As shown in FIGS. 7 and 9, the outer conductor of the coaxial cable 30 is in electrical contact to the connector body 51. As shown in FIG. 10, the connector body 51 is in press-fitted in opening 12 and hence in electrical contact with baseplate 2. Thus said outer conductor 32 is electrically connected to baseplate 2. The opening 12 as shown in FIG. 10 is located close to an apex 7 of the antenna radiating element 6. At the apex 7 a sleeve-like socket is arranged in a through-bore arranged in the antenna radiating element 6. Said sleeve-like socket 13 is press-fitted in the through-bore, extending into the opening 8 of the antenna radiating element 6, protruding from the inner surface 22 of the antenna radiating element 6. The socket comprises spring fingers 23 that are arranged in the opening 8 and apply a radial contact force on the distal end region 55 of the inner conductor 52 arranged in the sleeve 13, establishing an electrical connection between inner conductor 52 and sleeve 13 at pre-defined contact points. Between the insulator 56 and the apex 7 a small first gap 61 is arranged. As well a second gap 54 is arranged between the bottom surface of the opening 12 and the bottom face of the connector 50.

As shown in FIG. 11 a GPS module 25 or other electronic device may be arranged in opening 8 of antenna radiating element 6. Said GPS module 25 is connected to a supplemental cable 26 that extends from the opening 8 to a passage 20 arranged in one of the two stands 11 to a channel 10 arranged at the top surface 3 of the baseplate 2 to port 9, as shown in FIG. 3.

As shown in FIG. 12, a stand 11 may be arranged on an elevated platform 16 which protrudes from the top surface 3 of the baseplate 2, Such a platform 16.

The invention claimed is:

1. An antenna arrangement (1) comprising:
   a. a baseplate (2) being at least partially electrically conductive, said baseplate having a top surface (3) defining a top level (L1) and a bottom surface (4) defining a bottom level (L2);
   b. a first cup-shaped antenna radiating element (5) and a second cup-shaped antenna radiating element (6) having an apex (7) being arranged nearby to the top level (L1) of the baseplate (2) and, opposite to the apex (7), an opening (8) arranged distal to the top level (L1) of the baseplate (2);
   c. the first cup-shaped antenna radiating element (5) and the second antenna radiating element (6) being arranged above the baseplate (2) and spaced apart with respect to each other by a spacing, electrically interconnected to the baseplate (2);
   wherein
   d. the first cup-shaped antenna radiating element (5) being electrically interconnected in the region of its apex (7) to an inner conductor (32) of a first coaxial cable 30, said inner conductor (32) being arranged in the region of the apex (7) above said bottom level (L2);
   e. the second cup-shaped antenna radiating element (6) being electrically interconnected in the region of its apex (7) to an inner conductor (33) of a second coaxial cable (31), said inner conductor being arranged in the region of the apex above said bottom level (L2); and
   f. said baseplate (2) further comprising at least one port (9) arranged in the bottom surface (4) of the baseplate (2).

2. The antenna arrangement (1) according to claim 1, wherein the port (9) is arranged in the spacing between the first and the second antenna radiating element (5, 6) through which at least one of the coaxial cables (30, 31) extends across the bottom level (L2) of the baseplate.

3. The antenna arrangement (1) according to claim 1, wherein the first (30) and the second coaxial cable (31) are passing through the same port (9).

4. The antenna arrangement (1) according to claim 1, wherein between the apex (7) and the port (9) the inner conductors (32, 33) of the first and the second coaxial cable (30, 31) are substantially arranged between the top level (L1) and the bottom level (L2).

5. The antenna arrangement (1) according to claim 4, wherein the baseplate (2) comprises at least one channel (10) in which at least one inner conductor (32, 33) is arranged.

6. The antenna arrangement (1) according to claim 5, wherein the at least one channel (10) is arranged in the top (3) and/or bottom surface (4) of the baseplate (2).

7. The antenna arrangement (1) according to claim 1, wherein each of the antenna radiating elements (5, 6) is fixed to said baseplate (2) by at least one stand (11).

8. The antenna arrangement (1) according to claim 7, wherein the stand is arranged in a distance from the apex (7) of the antenna radiating element (5, 6).

9. The antenna arrangement (1) according to claim 1, wherein between the apex (7) of at least one antenna radiating element (5, 6) and the bottom level (L2) a connector (50) is embedded in the baseplate (2), said connector comprising an inner conductor (52) which in a mounted position is electrically interconnected to the first or the second antenna radiating element (5, 6) and to the inner conductor (32, 33) of the thereto related first or second coaxial cable (30, 31).

10. The antenna arrangement (1) according to claim 9, wherein the inner conductor (52) is inserted into an opening (12) arranged in the top and/or the bottom surface (3, 4) of the baseplate (2).

11. The antenna arrangement (1) according to claim 9, wherein the inner conductor (52) of the connector (50) comprises an opening (57) in which the inner conductor (32, 33) of the thereto related first (30) or second coaxial cable (31) is arranged.

12. The antenna arrangement (1) according to claim 9, wherein the inner conductor of the connector (50) is a pin (52) which reaches into a socket (13) arranged at the first (5) or the second antenna radiating element (6).

13. The antenna arrangement (1) according to claim 12, wherein the socket (13) comprises spring fingers (27) that are in mechanical and electrical connection to a distal end region (55) of the pin (52).

14. The antenna arrangement (1) according to claim 9, wherein the inner conductor (52) of the connector (50) comprises a socket and, in said socket, in a mounted state, a pin arranged at the first (5) or the second antenna radiating element (6) is located.

15. The antenna arrangement (1) according to claim 9, wherein an insulator (56) is arranged in the opening (53), supporting the inner conductor (52).

16. The antenna arrangement (1) according to claim 15, wherein the insulator (56) is separated from the antenna radiating element (5, 6) by a first gap (61).

17. The antenna arrangement (1) according to claim 9, wherein the connector (50) comprises a connector body (51) which is electrically interconnected to the outer conductor (34, 35) of the first (30) or second coaxial cable (31).

18. The connector arrangement (1) according to claim 17, wherein the connector body (51) comprises a connector port (63) arranged on a side turned away from the connected antenna radiator element (5, 6).

19. The connector arrangement (1) according to claim 18, wherein in the mounted position the connector port (63) is covered by the baseplate (2).

20. The antenna arrangement (1) according to claim 17, wherein the connector body (51) is integrally formed with the baseplate (2).

21. The antenna arrangement (1) according to claim 1, wherein at least one GPS module is arranged in the opening (8) of the first (5) or second antenna radiating element (6).

22. The antenna arrangement (1) according to claim 21, wherein the at least one GPS module (25) is interconnected with a supplemental cable (26) that extends from the opening (8) of the first (5) or second antenna radiating element (6) to a passage (20) arranged in a stand (11) of the first (5) or second antenna radiating element (6) to a channel (10) arranged in the baseplate (2), said channel extending to the at least one port (9) arranged in the bottom face of the baseplate (2).

* * * * *